(12) United States Patent
Furukawa et al.

(10) Patent No.: US 9,087,408 B2
(45) Date of Patent: Jul. 21, 2015

(54) SYSTEMS AND METHODS FOR GENERATING DEPTHMAPS

(75) Inventors: Yasutaka Furukawa, Bellevue, WA (US); David Robert Gallup, Lynnwood, WA (US)

(73) Assignee: Google Inc., Mountain View, CA (US)

( * ) Notice: Subject to any disclaimer, the term of this patent is extended or adjusted under 35 U.S.C. 154(b) by 926 days.

(21) Appl. No.: 13/291,029

(22) Filed: Nov. 7, 2011

(65) Prior Publication Data

US 2015/0154786 A1    Jun. 4, 2015

Related U.S. Application Data

(60) Provisional application No. 61/524,300, filed on Aug. 16, 2011.

(51) Int. Cl.
| | |
|---|---|
| *G06T 15/00* | (2011.01) |
| *G06T 15/40* | (2011.01) |
| *G06T 15/30* | (2011.01) |
| *G06T 15/10* | (2011.01) |
| *G06T 17/00* | (2006.01) |
| *G09G 5/00* | (2006.01) |
| *G06K 9/46* | (2006.01) |
| *G06K 9/36* | (2006.01) |
| *G06K 9/32* | (2006.01) |
| *H04N 7/18* | (2006.01) |
| *G06T 19/00* | (2011.01) |

(Continued)

(52) U.S. Cl.
CPC ............. *G06T 15/40* (2013.01); *G01C 11/025* (2013.01); *G06T 3/0093* (2013.01); *G06T 3/4007* (2013.01); *G06T 3/4038* (2013.01); *G06T 7/0028* (2013.01); *G06T 11/60* (2013.01); *G06T 15/20* (2013.01); *G06T 15/30* (2013.01); *G06T 15/405* (2013.01); *G06T 17/20* (2013.01); *G06T 19/00* (2013.01); *G09G 5/14* (2013.01); *H04N 7/181* (2013.01); *H04N 7/26563* (2013.01)

(58) Field of Classification Search
USPC ......... 345/419–423, 427, 428, 581, 619–629, 345/634; 382/240, 284, 293, 294, 298–300; 348/143, 144
See application file for complete search history.

(56) References Cited

U.S. PATENT DOCUMENTS

| | | | |
|---|---|---|---|
| 7,586,489 B2 | 9/2009 | Müller-Fischer et al. | |
| 2005/0271264 A1* | 12/2005 | Ito et al. | 382/154 |

(Continued)

OTHER PUBLICATIONS

Furukawa, Yasutaka, et al., "Towards Internet-scale Multi-View Stereo," IEEE, 2010, pp. 1434-1441.

*Primary Examiner* — Ke Xiao
*Assistant Examiner* — Andrew Shin
(74) *Attorney, Agent, or Firm* — Lerner, David, Littenberg, Krumholz & Mentlik, LLP

(57) ABSTRACT

Systems and methods for generating a depthmap for images of structures in a geographic area are provided. In some aspects, a method includes dividing the area into cells. Each of the cells is visible in no more than a threshold number of images. The method also includes: generating, using multi-view stereo processing, a set of three-dimensional (3D) points of structures in each of the cells based on the images associated with a corresponding one of the cells; generating a mesh model of the structures in each of the cells based on the set of 3D points for a corresponding one of the cells; identifying one or more of the mesh models visible in a corresponding one of the images; and generating a depthmap for each of the images based on the identified one or more mesh models visible in a corresponding one of the images.

23 Claims, 11 Drawing Sheets

(51) Int. Cl.
*G06T 3/40* (2006.01)
*G06T 3/00* (2006.01)
*G06T 11/60* (2006.01)
*G06T 15/20* (2011.01)
*G06T 17/20* (2006.01)
*H04N 19/63* (2014.01)
*G09G 5/14* (2006.01)
*G06T 7/00* (2006.01)
*G01C 11/02* (2006.01)

(56) References Cited

U.S. PATENT DOCUMENTS

| | | | |
|---|---|---|---|
| 2006/0284890 A1* | 12/2006 | Cosman et al. | 345/629 |
| 2007/0024620 A1 | 2/2007 | Müller-Fischer et al. | |
| 2008/0285843 A1 | 11/2008 | Lim | |
| 2009/0010507 A1 | 1/2009 | Geng | |
| 2009/0052796 A1* | 2/2009 | Furukawa et al. | 382/260 |
| 2010/0007669 A1* | 1/2010 | Bethune et al. | 345/520 |
| 2010/0201682 A1 | 8/2010 | Quan et al. | |
| 2011/0102553 A1 | 5/2011 | Corcoran et al. | |

\* cited by examiner

SYSTEMS AND METHODS FOR GENERATING DEPTHMAPS

CROSS-REFERENCES TO RELATED APPLICATIONS

The present application claims the benefit of U.S. Provisional Patent Application Ser. No. 61/524,300, entitled "Systems and Methods for Generating Depthmaps," filed on Aug. 16, 2011, which is hereby incorporated by reference in its entirety for all purposes.

FIELD

The subject technology generally relates to depthmap generation and, in particular, relates to systems and methods for generating depthmaps for images of structures in an area.

BACKGROUND

Aerial images of structures may be used in maps to convey two-dimensional positional information of the structures. However, these images do not convey geometry and/or depth information of the structures. The geometry and/or depth information of the structures may be useful for three-dimensional structure modeling as well as geometry-based rendering applications.

SUMMARY

According to various aspects of the subject technology, a computer-implemented method for generating a depthmap for images of structures in a geographic area is provided. The method comprises dividing the geographic area into a plurality of coarse cells. Each of the plurality of coarse cells is visible in no more than a first threshold number of a plurality of low-resolution images. The method also comprises generating, using multi-view stereo processing, a set of coarse three-dimensional (3D) points of one or more structures in each of the plurality of coarse cells based on the plurality of low-resolution images associated with a corresponding one of the plurality of coarse cells. The method also comprises dividing the geographic area into a plurality of fine cells. Each of the plurality of fine cells is visible in no more than a second threshold number of a plurality of high-resolution images. The method also comprises generating, using multi-view stereo processing, a set of fine 3D points of the one or more structures in each of the plurality of fine cells based on at least a portion of the set of coarse 3D points generated for a corresponding one of the plurality of coarse cells and based on the plurality of high-resolution images associated with a corresponding one of the plurality of fine cells. The method also comprises generating a mesh model of the one or more structures in each of the plurality of fine cells based on the set of fine 3D points for a corresponding one of the plurality of fine cells. The method also comprises identifying one or more of the mesh models visible in a corresponding one of the plurality of high-resolution images. The method also comprises generating a depthmap for each of the plurality of high-resolution images based on the identified one or more mesh models visible in a corresponding one of the plurality of high-resolution images.

According to various aspects of the subject technology, a system for generating a depthmap for images of structures in a geographic area is provided. The system comprises a cluster module configured to divide the geographic area into a plurality of coarse cells and a plurality of fine cells. Each of the plurality of coarse cells is visible in no more than a first threshold number of a plurality of low-resolution images. Each of the plurality of fine cells is visible in no more than a second threshold number of a plurality of high-resolution images. The system also comprises a three-dimensional (3D) point module configured to generate, using multi-view stereo processing, a set of coarse three-dimensional (3D) points of one or more structures in each of the plurality of coarse cells based on the plurality of low-resolution images associated with a corresponding one of the plurality of coarse cells. The 3D point module is further configured to generate, using multi-view stereo processing, a set of fine 3D points of the one or more structures in each of the plurality of fine cells based on at least a portion of the set of coarse 3D points generated for a corresponding one of the plurality of coarse cells and based on the plurality of high-resolution images associated with a corresponding one of the plurality of fine cells. The system also comprises a mesh generation module configured to generate a mesh model of the one or more structures in each of the plurality of fine cells based on the set of fine 3D points for a corresponding one of the plurality of fine cells. The system also comprises a mesh identification module configured to identify one or more of the mesh models visible in a corresponding one of the plurality of high-resolution images. The system also comprises a depthmap module configured to generate a depthmap for each of the plurality of high-resolution images based on the identified one or more mesh models visible in a corresponding one of the plurality of high-resolution images.

According to various aspects of the subject technology, a machine readable medium encoded with executable instructions for generating a depthmap for images of structures in a geographic area is provided. The instructions comprise code for dividing the geographic area into a plurality of cells. Each of the plurality of cells is visible in no more than a threshold number of a plurality of images. The instructions also comprise code for generating, using multi-view stereo processing, a set of three-dimensional (3D) points of one or more structures in each of the plurality of cells based on the plurality of images associated with a corresponding one of the plurality of cells. The instructions also comprise code for generating a mesh model of the one or more structures in each of the plurality of cells based on the set of 3D points for a corresponding one of the plurality of cells. The instructions also comprise code for identifying one or more of the mesh models visible in a corresponding one of the plurality of images. The instructions also comprise code for generating a depthmap for each of the plurality of images based on the identified one or more mesh models visible in a corresponding one of the plurality of images.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
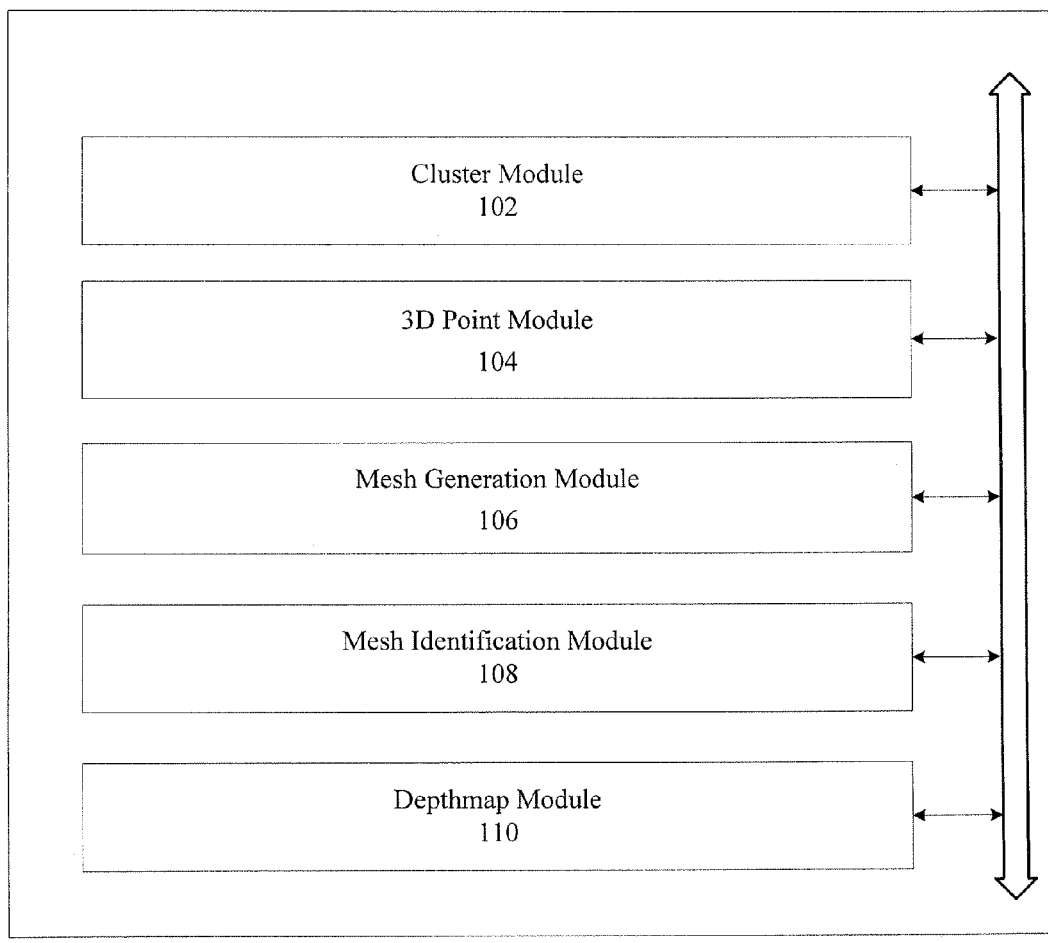
FIG. 1 illustrates an example of a system for generating a depthmap for images of one or more structures in a geographic area, in accordance with various aspects of the subject technology.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

For mapping applications, images of structures in a geographic area may be obtained in various ways. For example, cameras may be mounted on a plane or some other elevated area to capture aerial images of the structures. Cameras mounted on a satellite may capture satellite images of the structures. Cameras on the ground may also be used to capture ground-level images of the structures. The structures can be natural structures (e.g., hills, mountains, valleys, etc.) or artificial, man-made structures (e.g., buildings, towers, bridges, signs, billboards, etc.). According to certain aspects, oblique images (e.g., aerial images taken of the structures from about a 45-degree angle from a normal to a surface of the Earth) are preferably used for mapping applications because these images generally provide a view of both a top of the structures and a side of the structures. However, oblique images taken of the structures from angles greater than or less than the 45-degree angle may also be used, provided that the top of the structures and the side of the structures are visible.

The images of the structures typically do not convey geometry and/or depth information of the structures. The geometry and/or depth information of the structures may be useful for three-dimensional (3D) structure modeling as well as geometry-based rendering applications. According to various aspects of the subject technology, depthmaps may be generated for these images.

In some aspects, a four-stage process may be utilized to generate the depthmaps. In a first stage, the geographic area may be divided into cells such that a subset of the total number of images of the area is processed together for each cell to generate the depthmaps. This division is useful because the total number of images of the geographic area captured can be large in volume (e.g., hundreds of thousands of images can be captured for a city), and due to memory limitations, generating depthmaps for all the images together can be difficult. Thus, in the first stage, the area may be divided into cells, wherein each cell is visible in no more than a specified threshold number of the images. The images for each cell are clustered together.

In a second stage, the cluster of images for each cell may be processed, using multi-view stereo processing, to generate a set of 3D points of the structures in each cell. In a third stage, a mesh model of the structures may be generated per cell using the set of 3D points from the second stage. The mesh model can be generated, for example, by using a Poisson surface reconstruction operation to convert the 3D points into the mesh model. Trimming can be performed to correct for any defects from the Poisson surface reconstruction operation. In a fourth stage, the mesh models may be rendered into the images in which they are visible to produce the depthmaps.

FIG. 1 illustrates an example of system 100 for generating a depthmap for images of one or more structures in a geographic area, in accordance with various aspects of the subject technology. System 100 comprises cluster module 102, 3D point module 104, mesh generation module 106, mesh identification module 108, and depthmap module 110. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

According to certain aspects, system 100 may be utilized to implement the four-stage process described above. As discussed above, the geographic area may be divided into cells in the first stage, wherein each cell is visible in no more than a specified threshold number of the images. The visibility of a particular cell can be determined by using camera information. For example, when a camera obtains a particular image, camera information can be stored in that particular image as metadata. This camera information may include the time when the camera captured the particular image, the position and/or orientation of the camera at that time, the visible surface region estimate of the camera as projected onto the Earth's surface, and other suitable information. For example, if the particular cell intersects with the visible surface region estimate of the camera as projected onto the Earth's surface, then the particular cell may be considered visible in the image storing that metadata. However, the visibility of a particular cell may also be based on whether or not any of the structures in or around the cell are obstructing the view of the camera, thereby rendering the camera information associated with the particular image to be inaccurate. Without a proper reconstruction of the structures (which is performed in the second stage using 3D point reconstruction), it may not be possible to determine with accuracy the visibility of a particular cell in the first stage. This is attune to a "chicken or the egg" problem.

Aspects of the subject technology solve the foregoing problem by repeating the first stage and the second stage, wherein in the first iteration, coarse cells of the geographic area are created and the visibility of each of the coarse cells is roughly determined based on the camera information associated with the images and not on any of the structures. The images of the structures used for the coarse cells may be low-resolution images. After the first iteration, 3D points of the structures in the area are generated. In the second iteration, fine cells of the geographic area are generated. In contrast to the low-resolution images used for the coarse cells, the images of the structures used for the fine cells may be high-resolution images. The visibility of each of the fine cells can be more accurately determined by using not only the camera information associated with the high-resolution images, but also the 3D points of the structures generated from the first iteration. With the 3D points of the structures, it can be determined if any of the structures are obstructing the visibility of any particular fine cell. Because only an approximate 3D model of the structures is needed to make such a determination, low-resolution images may be used for the coarse cells rather than high-resolution images. The use of the low-resolution images allows the first iteration to be implemented more quickly.

According to certain aspects, more than one system, such as system 100, may be used to implement the four-stage process (including the repetition of the first and second stages) for different parts of the geographic area to reduce the total amount of time needed to generate the depthmaps. As discussed above, as many as several hundred thousands of images of a geographic area, such as a city, can be acquired. Multiple systems, as many as two thousand different systems, may be used in parallel to process the images to generate the depthmaps. However, a greater number or a fewer number of systems may be used depending on the desired time to generate the depthmaps, the number of images acquired, the hardware associated with each of the systems, etc. Each of the multiple systems may implement the four-stage process for a different part of the geographic area to generate one or more depthmaps associated with a corresponding part.

Figure 2:
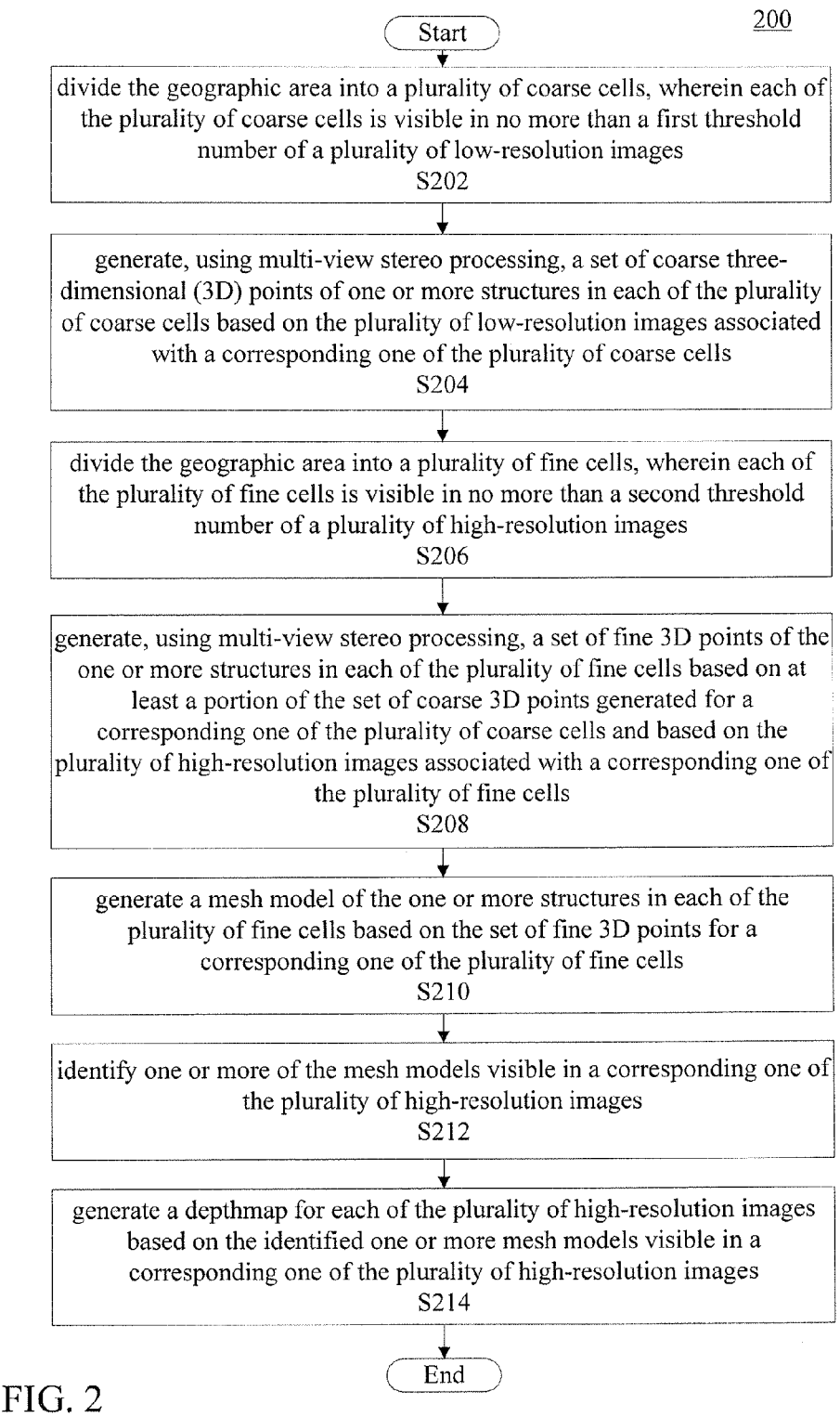
FIG. 2 illustrates an example of a method for generating a depthmap for images of one or more structures in a geographic area, in accordance with various aspects of the subject technology.

FIG. 2 illustrates an example of method 200 for generating a depthmap for images of one or more structures in a geographic area, in accordance with various aspects of the subject technology. Method 200 incorporates the 4-stage process discussed above, along with the repetition of the first stage and the second stage. Steps S202 and S204 correspond to the first stage and the second stage, respectively, of the first iteration. Steps S206 and S208 correspond to the first stage and the second stage, respectively, of the second iteration. Step S210 corresponds to the third stage. Steps S212 and S214 correspond to the fourth stage.

In an initialization step at the "Start" of method 200, cluster module 102 may receive a plurality of high-resolution images (e.g., at least 25 megapixel images) of the structures in the geographic area. However, a greater resolution or a lower resolution (compared to 25 megapixels) may be used depending on the desired quality of the depthmap to be generated. The plurality of high-resolution images may be obtained by using the various methods described above. Preferably, these images are oblique images. Cluster module 102 may also generate a low-resolution image based on a corresponding one of the plurality of high-resolution images (e.g., by down sampling the high-resolution images or using other suitable techniques to lower the resolution of the high-resolution images). For example, a low-resolution image may have $\frac{1}{16}$th the resolution of a corresponding high-resolution image.

Figure 3:
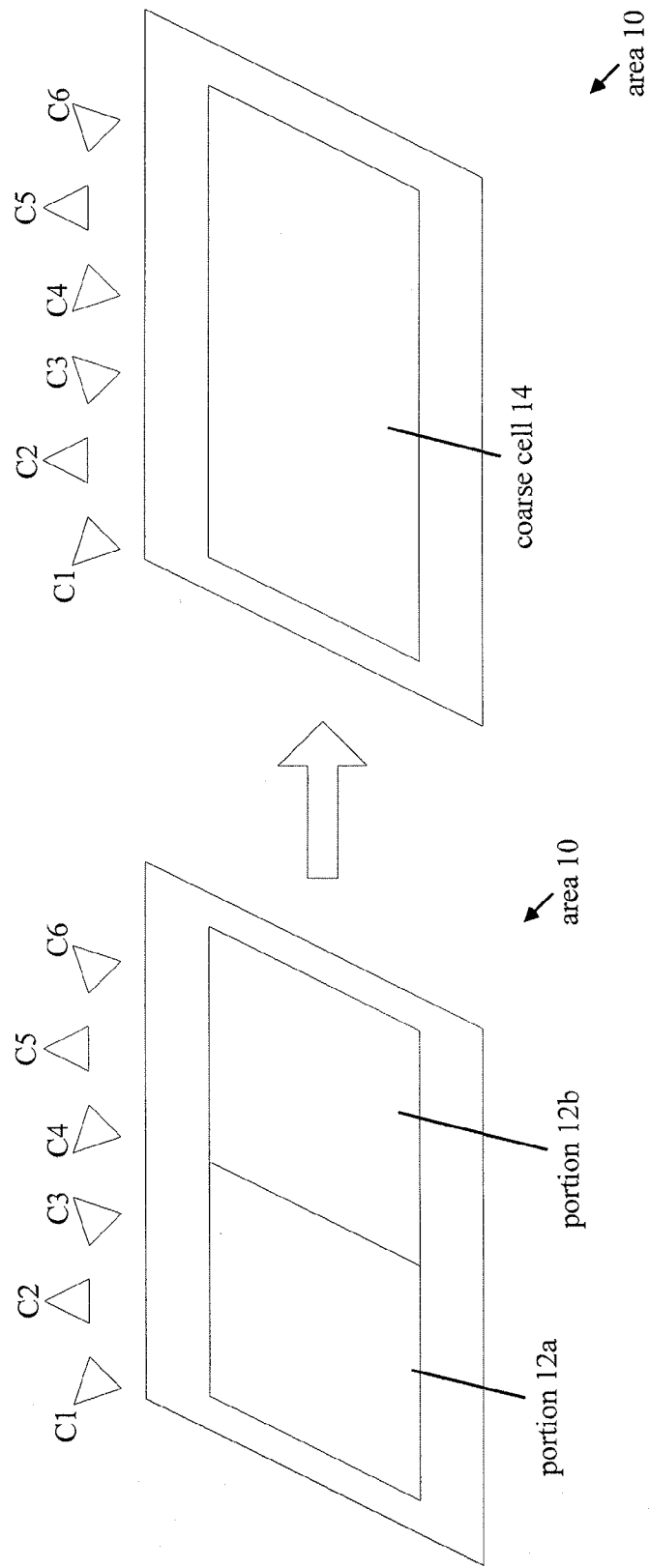
FIG. 3 illustrates an example of generating a coarse cell, in accordance with various aspects of the subject technology.

According to step S202, cluster module 102 divides the geographic area into a plurality of coarse cells, wherein each of the plurality of coarse cells is visible in no more than a first threshold number of the plurality of low-resolution images. In some aspects, each of the plurality of coarse cells may also include the space above and/or below each respective coarse cell. FIG. 3 illustrates an example of generating a coarse cell 14, in accordance with various aspects of the subject technology. As shown, geographic area 10 is initially divided into various portions (e.g., portions 12a and 12b), which may also include the space above and/or below each respective portion. In some aspects, these portions may be equally sized, and may serve as an initial frame of reference for determining which of the plurality of low-resolution images corresponds to a given portion of geographic area 10. As shown, cameras C1, C2, C3, and C6 may each obtain a high-resolution image of portion 12a, while cameras C1, C4, C5, and C6 may each obtain a high-resolution image of portion 12b. These high-resolution images may be converted into corresponding low-resolution images as discussed above. Each of the cameras may represent a respective image (either high-resolution or low-resolution) of the portions of area 10. As discussed above, each of these images may comprise metadata that includes a visible surface region estimate of geographic area 10. The visible surface region estimate may comprise latitude and longitude information of geographic area 10. For example, the visible surface region estimate may comprise a rectangle with sides defined by latitude and longitude coordinates. This rectangle may be projected onto the surface of the Earth and correspond to what is viewable by a particular camera.

In some aspects, the visibility of any of the portions of area 10 is based on whether a particular portion of geographic area 10 intersects with a corresponding one of the visible surface region estimates. For example, the visible surface region estimates of cameras C1, C2, C3, and C6 may intersect with portion 12a. Thus, portion 12a may be considered visible in the images obtained by cameras C1, C2, C3, and C6. Similarly, the visible surface region estimates of cameras C1, C4, C5, and C6 may intersect with portion 12b. Thus, portion 12b may be considered visible in the images obtained by cameras C1, C4, C5, and C6.

Geographic area 10 may be initially divided into portions such that each portion of geographic area 10 is visible in about 40-50 high-resolution images. However, as discussed above, only a rough approximation of the 3D points is needed in the first iteration. Thus, the plurality of the low-resolution images may be used instead. Because processing low-resolution images is less memory intensive than high-resolution images, a larger number of low-resolution images may be processed together to generate the 3D points. As a result, portions of geographic area 10 may be merged together to generate a coarse cell that is visible in a larger number of low-resolution images compared to the 40-50 high-resolution images. For example, portions of area 10 may be merged together to form a plurality of coarse cells, each of which is visible in no more than a threshold number of 300 low-resolution images. The low-resolution images corresponding to each coarse cell may then be processed together to generate the 3D points. However, a greater threshold number or lower threshold number of low-resolution images may be processed together depending on the desired time to generate the depthmaps.

In the example shown in FIG. 3, portions 12*a* and 12*b* may be merged together to form coarse cell 14. While each of portions 12*a* and 12*b* are visible in four high-resolution images each, portions 12*a* and 12*b* may be merged together to form coarse cell 14 that is visible in the six low-resolution images obtained by cameras C1, C2, C3, C4, C5, and C6. This process may be repeated with other portions of geographic area 10 to generate other coarse cells that are visible in no more than the threshold number of low-resolution images.

Figure 4:
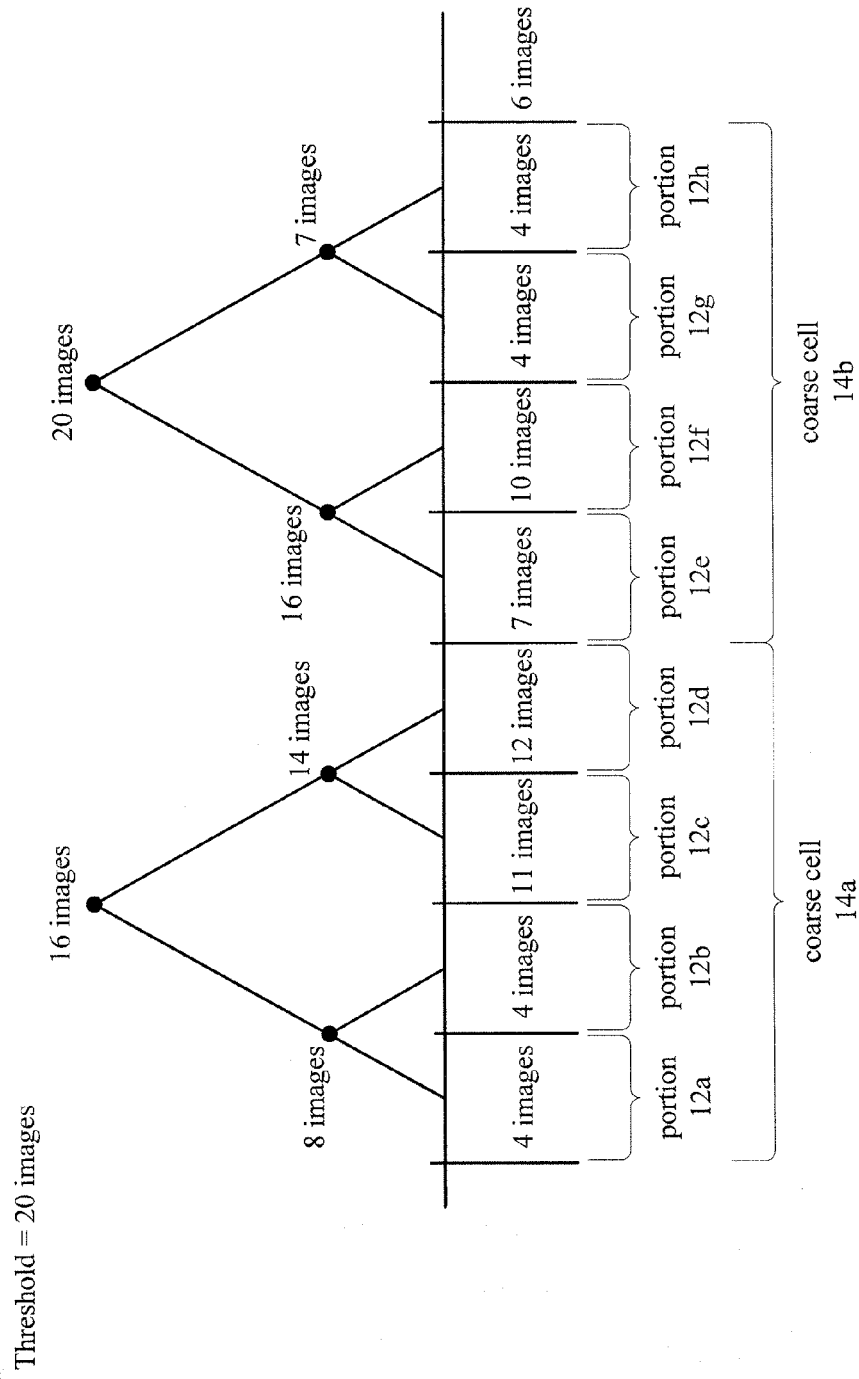
FIG. 4 illustrates an example of merging portions of a geographic area together to generate coarse cells, in accordance with various aspects of the subject technology.

FIG. 4 illustrates an example of merging portions 12*a*, 12*b*, 12*c*, 12*d*, 12*e*, 12*f*, 12*g*, and 12*h* of geographic area 10 together to generate coarse cells 14*a* and 14*b*, in accordance with various aspects of the subject technology. In this example, the threshold is shown as 20 low-resolution images. However, other suitable values for the threshold may be used, such as the threshold of 300 low-resolution images as discussed above. In FIG. 4, each portion is shown with a corresponding number representing the number of low-resolution images that each portion is visible in. For example, portion 12*a* is visible in 4 low-resolution images, portion 12*b* is visible in 4 low-resolution images, portion 12*c* is visible in 11 low-resolution images, and so on. Each of these portions is visible in less than 20 low-resolution images. Thus, some or all of the portions may be merged together without forming larger portions that exceed the threshold. For example, portions 12*a* and 12*b* may be merged together. As a result, portions 12*a* and 12*b*, when merged together, are visible in 8 low-resolution images, as illustrated by the node above portions 12*a* and 12*b*.

Note, however, that some of the portions may be visible in the same image. For example, while portion 12*c* is visible in 11 images, portion 12*d* is visible in 12 images, some of which are the same images as associated with portion 12*c*. Thus, when portions 12*c* and 12*d* are merged together, the resulting merged portion may still be visible in less than the threshold of 20 low-resolution images. For example, portions 12*c* and 12*d*, when merged together, are visible in 14 low-resolution images, as illustrated by the node above portions 12*c* and 12*d*. Portions 12*a*, 12*b*, 12*c*, and 12*d* may again be merged together to form coarse cell 14*a*, which is visible in 16 low-resolution images and does not exceed the threshold of 20 low-resolution images, as illustrated by the node above portions 12*a*, 12*b*, 12*c*, and 12*d*. Similarly, portions 12*e*, 12*f*, 12*g*, and 12*h* may be merged together to form coarse cell 14*b*, which is visible in 20 low-resolution images and does not exceed the threshold. Portions of area 10 may be merged in this manner such that each coarse cell formed is visible in no more than the threshold number of low-resolution images.

Returning to FIGS. 1 and 2, according to step S204, 3D point module 104 may generate, using multi-view stereo processing, a set of coarse 3D points of one or more structures in each of the plurality of coarse cells (formed according to step S202) based on the plurality of low-resolution images associated with a corresponding one of the plurality of coarse cells. For example, a set of coarse 3D points for a particular coarse cell may be generated based on the low-resolution images in which that particular coarse cell is visible. In some aspects, patch-based multi-view stereo processing may be used to generate the coarse 3D points. Multi-view stereo processing may involve decomposing a collection of images into a set of overlapping sets of images, and merging the resulting reconstructions, thereby yielding 3D points of structures visible in the collection of images. Each of these 3D points may comprise a surface portion and a pointer normal to the surface portion. Thus, the 3D points may be oriented in a particular direction to provide an accurate depiction of a particular structure.

Figure 5:
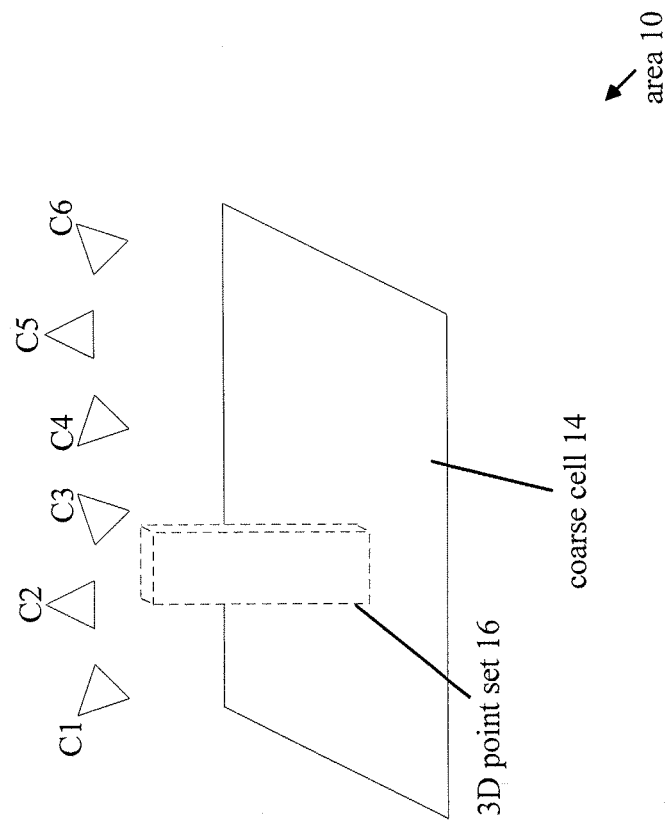
FIG. 5 illustrates an example of a coarse 3D point set of a structure in a coarse cell, in accordance with various aspects of the subject technology.

FIG. 5 illustrates an example of a coarse 3D point set 16 of a structure in coarse cell 14, in accordance with various aspects of the subject technology. As shown, the coarse 3D point set 16 is arranged in an outline of a building. Returning to FIG. 2, while steps S202 and S204 correspond to the first stage and the second stage, respectively, of the first iteration, steps S206 and S208 correspond to the first stage and the second stage, respectively, of the second iteration. As discussed above, after the first iteration, coarse 3D points of the structures in geographic area 10 are generated. In the second iteration, fine cells of geographic area 10 are generated, wherein the visibility of each of the fine cells can be more accurately determined by using the camera information associated with the high-resolution images in addition to the coarse 3D points of the structures generated from the first iteration. For example, in the second iteration, each of the plurality of coarse cells from the first iteration may be divided into a plurality of fine cells, each of which is visible in no more than a second threshold number of the plurality of high-resolution images.

According to step S206, cluster module 102 may divide geographic area 10 into a plurality of fine cells, wherein each of the plurality of fine cells is visible in no more than the second threshold number of the plurality of high-resolution images. In some aspects, each of the plurality of fine cells may also include the space above and/or below each respective fine cell. For example, each of the plurality of coarse cells generated in step S202 may be divided into a plurality of fine cells. Because the coarse 3D points of the structures are generated in the first iteration, the visibility of each of the plurality of fine cells can now be determined more accurately with knowledge of whether or not the structures (e.g., as determined from the coarse 3D points) may obstruct a view of any particular camera. Furthermore, the high-resolution images provide more accurate visibility information compared to the low-resolution images used in the first iteration. However, because processing the high-resolution images to generate fine 3D points may be memory-intensive compared to the low-resolution images, a fewer number of high-resolution images can be processed for each fine cell compared to the number of low-resolution images for each coarse cell. Thus, the second threshold number may be less than the first threshold number. For example, the second threshold number may be between 40-60 high-resolution images. However, a greater threshold number or lower threshold number of high-resolution images may be processed together depending on the desired time to generate the depthmaps. According to certain aspects, high-resolution images that do not provide a view of a particular fine cell (because of an obstruction by a structure) can be removed from processing, thereby providing an additional way to reduce the number of high-resolution images to be processed.

Figure 6:
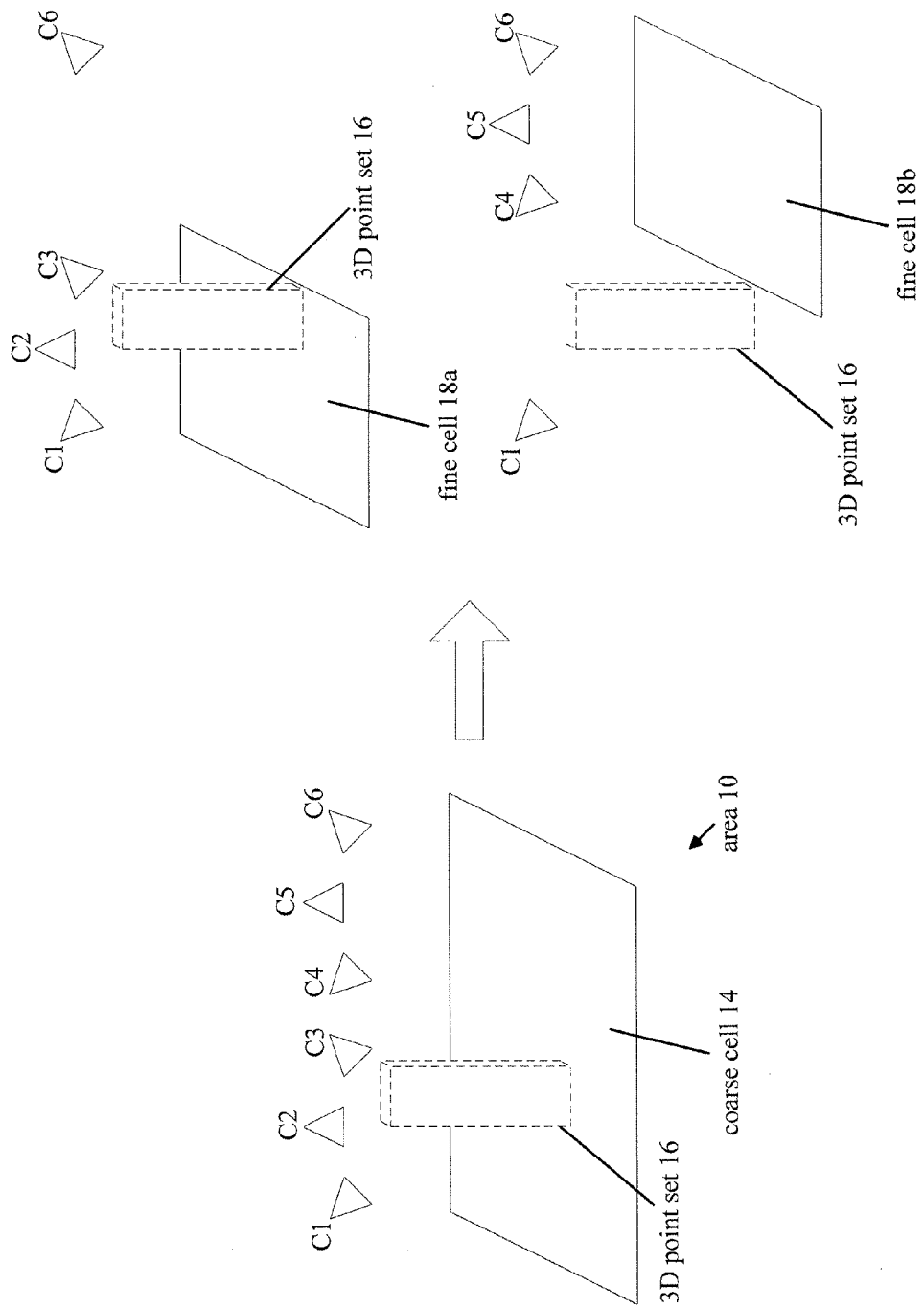
FIG. 6 illustrates an example of a coarse cell being divided into fine cells, in accordance with various aspects of the subject technology.

FIG. 6 illustrates an example of coarse cell 14 being divided into fine cells 18*a* and 18*b*, in accordance with various aspects of the subject technology. As discussed above in the example of FIG. 3, coarse cell 14 may be considered visible in the six low-resolution images from cameras C1, C2, C3, C4, C5, and C6 because coarse cell 14 intersects with the visible surface region estimates of cameras C1, C2, C3, C4, C5, and C6. Fine cells 18*a* and 18*b* are visible in a lower number of high-resolution images compared to coarse cell 14. The visibility of fine cells 18*a* and 18*b*, however, is not just based on the visible surface region estimates of respective cameras, but also based on the coarse 3D point set 16 generated in the first iteration. For example, as shown in FIG. 6, fine cell 18*b* may be considered visible in the four images from cameras C1, C4, C5, and C6 if only the visible surface region estimates of cameras C1, C4, C5, and C6 were considered. However, using the coarse 3D point set 16 generated from the first iteration, it is now known that the structure depicted by the coarse 3D point set 16 obstructs the view of camera C1. Thus, by using the coarse 3D point set 16, it can be determined that fine cell 18*b* is visible only in the images of cameras C4, C5, and C6, and not C1. According to certain aspects, a fine cell may be considered visible in a particular image if $Y/X \geq K$, where X is the number of coarse 3D points that are inside the fine cell, Y is the number of coarse 3D points that are inside the fine cell and project inside the particular image, and K is a visibility factor.

For example, K may be a ratio of Y to X, which may indicate the number of coarse 3D points that are visible in the fine cell compared to the total number of coarse 3D points inside the fine cell. If the image sees the entire fine cell, then K may be 1, and the image can be used to reconstruct the fine cell. On the other hand, if the image does not see the fine cell, then K may be 0. If K is too large, however, then the image may be too focused on the particular fine cell, and may not be able to see other fine cells. However, if K is too small, then the image may see too many fine cells and not be focused enough on the particular fine cell. Thus, according to certain aspects, K may preferably be between 0.4 and 0.6.

Figure 7:
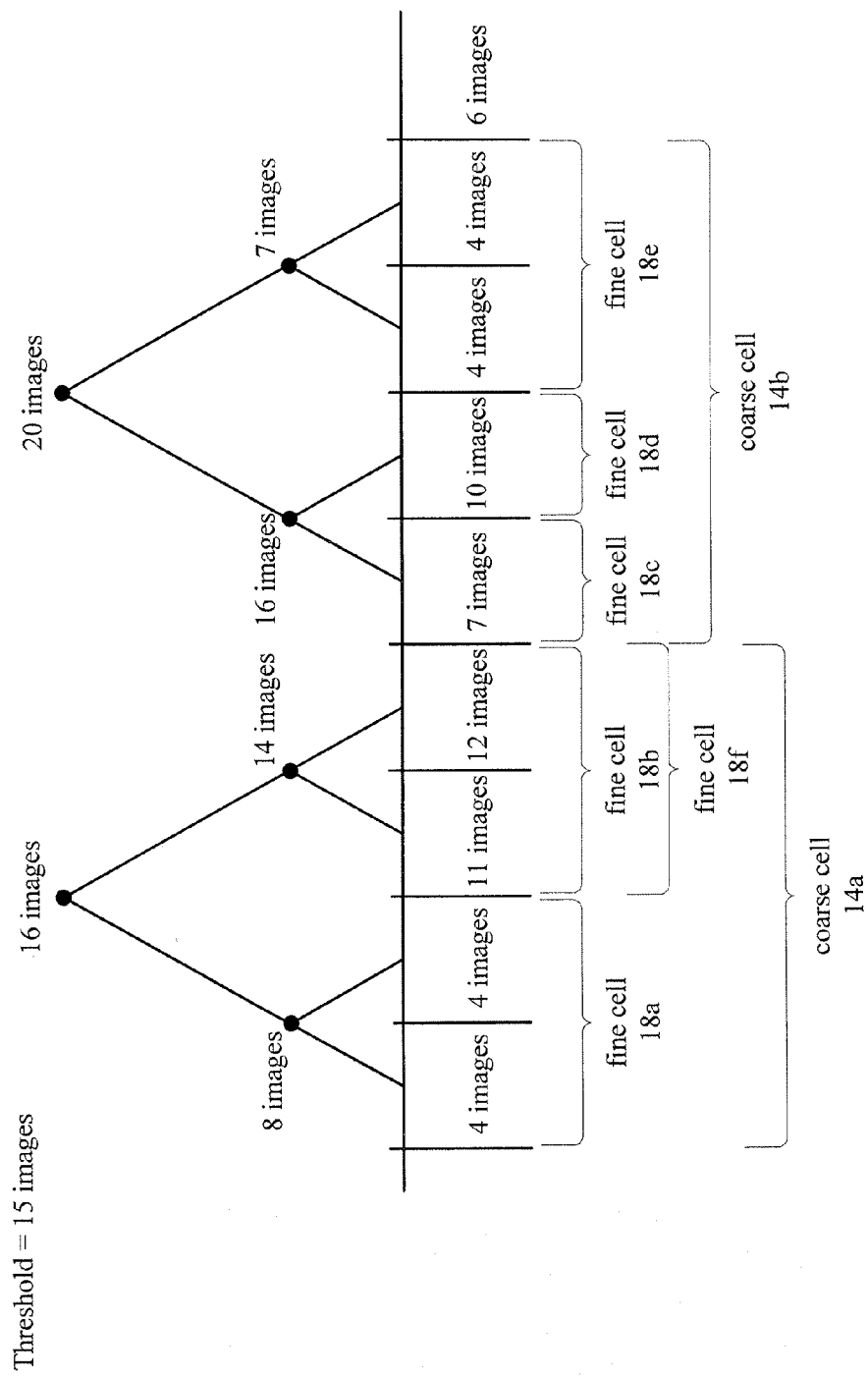
FIG. 7 illustrates an example of dividing coarse cells to generate fine cells, in accordance with various aspects of the subject technology.

FIG. 7 illustrates an example of dividing coarse cells 14*a* and 14*b* to generate fine cells 18*a*, 18*b*, 18*c*, 18*d*, 18*e*, and 18*f*, in accordance with various aspects of the subject technology. This example continues from the example shown in FIG. 4. In the example of FIG. 4, the threshold number of low-resolution images is 20. In the current example of FIG. 7, the threshold number of high-resolution images is 15. Thus, coarse cells 14*a* and 14*b* can be divided into fine cells 18*a*, 18*b*, 18*c*, 18*d*, 18*e*, and 18*f*, wherein each of these fine cells is visible in no more than 15 high-resolution images. For example, coarse cell 14*a* may be divided into fine cells 18*a* and 18*b*, wherein fine cell 18*a* is visible in 8 high-resolution images while fine cell 18*b* is visible in 14 high-resolution images, as illustrated by the respective nodes above fine cells 18*a* and 18*b*. Thus, fine cells 18*a* and 18*b* do not exceed the threshold number of 15 high-resolution images.

Note that some of the fine cells may be visible in the same image. For example, while fine cell 18*a* is visible in 8 images, fine cell 18*b* is visible in 14 images, some of which are the same images as associated with fine cell 18*a*. Thus, when fine cells 18*a* and 18*b* are split from coarse cell 14*a* (which is visible in 16 images), the number of images associated with each of fine cells 18*a* and 18*b* do not necessarily add up to exactly 16 images. As a result of the shared images between the fine cells, it may be possible that the number of images associated with a fine cell may not become less than the threshold number no matter how many times the coarse cell is split. For example, this problem may occur when the number of images at a child node (e.g., the node above fine cell 18*b*) is more than about 0.7 times the number of images at a parent node (e.g., the highest node above coarse cell 14*a*). In such a case, coarse cell 14*a* may be divided such that the resulting fine cells cover the same area (e.g., fine cells 18*b* and 18*f*), but may be visible in different sets of images, wherein each set is less than the threshold number of images.

Similar to coarse cell 14*a*, coarse cell 14*b* may be divided into fine cells 18*c*, 18*d*, and 18*e*. Fine cell 18*c* is visible in 7 high-resolution images, fine cell 18*d* is visible in 10 high-resolution images, and fine cell 18*e* is visible in 7 high-resolution images, none of which exceeds the threshold of 15 high-resolution images. According to certain aspects, after each coarse cell is divided into the plurality of fine cells, each of the plurality of fine cells may be expanded by about 10-20%, thereby ensuring that neighboring fine cells fit together seamlessly.

Returning to FIGS. 1 and 2, according to step S208, 3D point module 104 may generate, using multi-view stereo processing, a set of fine 3D points of the one or more structures in each of the plurality of fine cells (e.g., generated in step S206) based on at least a portion of the set of coarse 3D points generated for a corresponding one of the plurality of coarse cells and based on the plurality of high-resolution images associated with a corresponding one of the plurality of fine cells. For example, a set of fine 3D points for a particular fine cell may be generated based on the high-resolution images in which that particular fine cell is visible (the visibility of which is based on at least a portion of the set of coarse 3D points generated for a coarse cell that the particular fine cell is divided from). In some aspects, patch-based multi-view stereo processing may be used to generate the fine 3D points.

Figure 8:
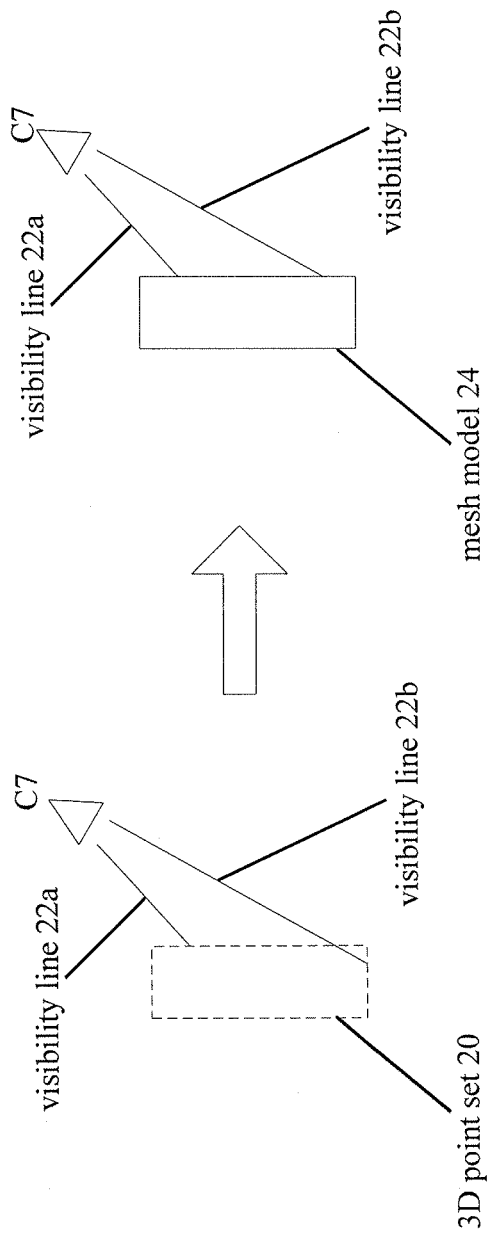
FIG. 8 illustrates an example of a fine 3D point set, in accordance with various aspects of the subject technology.

FIG. 8 illustrates an example of a fine 3D point set 20, in accordance with various aspects of the subject technology. In this example, fine 3D point set 20 is arranged in an outline of a building. FIG. 8 also illustrates a camera C7, which may represent the camera obtaining the particular high-resolution image of the building represented by fine 3D point set 20. In the corresponding depthmap of that particular high-resolution image, camera C7 serves as a point of reference for determining the depth of the building. For example, the depth of the building is represented by the distance between a particular point of the building to the position of camera C7, as shown by visibility line 22*a*. However, because the fine 3D point set 20 is not continuous, there may be certain gaps in the fine 3D point set 20 that would allow camera C7 to "see through" the building, as illustrated by visibility line 22*b*. This problem may be addressed by generating a mesh model of the building, as illustrated by mesh model 24 in FIG. 8. Because mesh model 24 does not have any gaps, neither visibility line 22*a* or 22*b* can see through mesh model 24, and the depth of the building can be accurately measured.

Returning to FIGS. 1 and 2, according to step S210, mesh generation module 106 may generate a mesh model of the one or more structures in each of the plurality of fine cells based on the set of fine 3D points (e.g., generated in step S208) for a corresponding one of the plurality of fine cells. For example, a mesh model of a structure in a particular fine cell may be generated based on the set of fine 3D points generated for that particular fine cell. In some aspects, the mesh model may be generated by using a Poisson surface reconstruction operation to convert a corresponding set of fine 3D points into the mesh model. Mesh generation module 106 may also trim the mesh model to eliminate one or more disparities from corresponding one or more structures.

Because high-resolution images may be used to generate the set of fine 3D points for a particular fine cell, the number of fine 3D points may also be very large in number (e.g., tens to hundreds of millions of 3D points). Processing this large number of fine 3D points using the Poisson surface reconstruction operation can be memory-intensive. Thus, in a similar manner as described with respect to FIG. 7, each fine cell may be divided into a plurality of sub-regions for processing, wherein each sub-region is associated with no more than a third threshold number of fine 3D points. For example, the third threshold number may be 4 million fine 3D points. However, a greater threshold number or lower threshold number of fine 3D points may be processed together depending on the desired time to generate the depthmaps.

Figure 9:
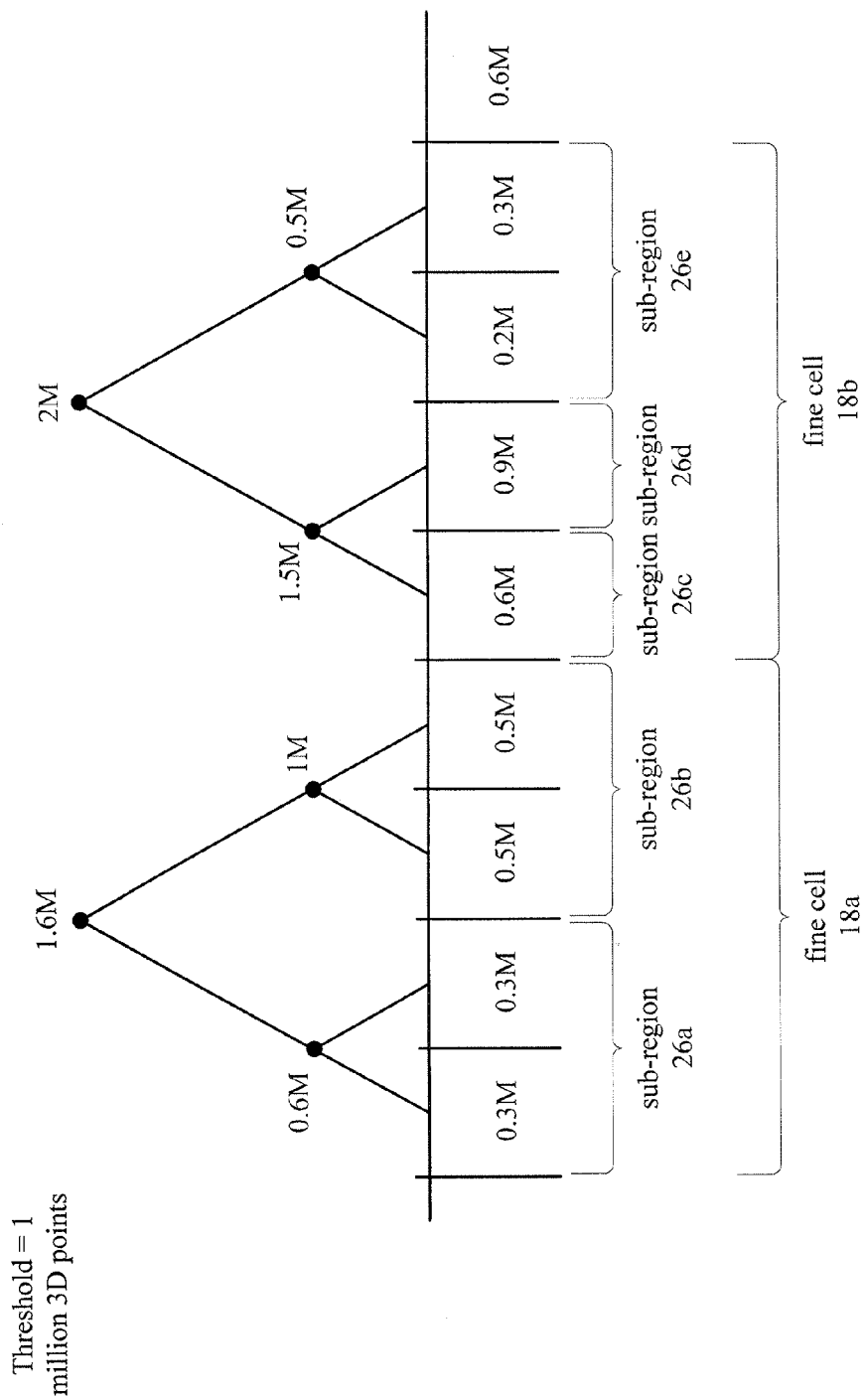
FIG. 9 illustrates an example of dividing fine cells into sub-regions, in accordance with various aspects of the subject technology.

FIG. 9 illustrates an example of dividing fine cells 18*a* and 18*b* into sub-regions 26*a*, 26*b*, 26*c*, 26*d*, and 26*e*, in accordance with various aspects of the subject technology. In this example, 1 million is the third threshold number of fine 3D points, and 1.6 million fine 3D points is associated with fine cell 18a while 2 million fine 3D points is associated with fine cell 18b. Thus, fine cells 18a and 18b may be divided into sub-regions 26a, 26b, 26c, 26d, and 26e, wherein each of these sub-regions is associated with no more than 1 million fine 3D points. For example, fine cell 18a may be divided into sub-regions 26a and 26b, wherein sub-region 26a is associated with 0.6 million fine 3D points while sub-region 26b is associated with 1 million fine 3D points, as depicted by the respective nodes above sub-regions 26a and 26b. Thus, sub-regions 26a and 26b do not exceed the threshold number of 1 million fine 3D points. Similarly, fine cell 18b may be divided into sub-regions 26c, 26d, and 26e. Sub-region 26c is associated with 0.6 million fine 3D points, sub-region 26d is associated with 0.9 million fine 3D points, and sub-region 26e is associated with 0.5 million fine 3D points, none of which exceeds the threshold of 1 million fine 3D points.

Figure 10:
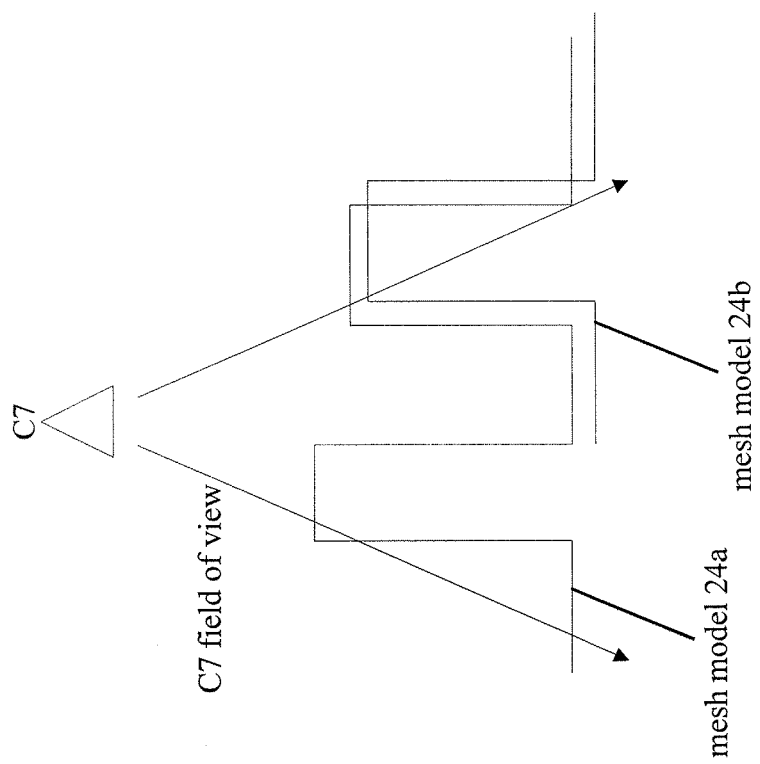
FIG. 10 illustrates an example of mesh models visible within a field of view of a camera, in accordance with various aspects of the subject technology.

Returning to FIGS. 1 and 2, according to step S212, mesh identification module 108 may now identify one or more of the mesh models (e.g., generated in step S210) that are visible in a corresponding one of the plurality of high-resolution images. For example, mesh identification module 108 may identify which of the plurality of mesh models generated in step S210 are visible in a particular image. Mesh modification module 108 may identify a particular mesh model by comparing the position of that mesh model with the position of a camera capturing that particular image. If any portion of the mesh model intersects a projection from the camera to its visible surface region estimate (e.g., the portion of the mesh model is within the camera's field of view), then that mesh model is considered visible in the particular image. FIG. 10 illustrates an example of this concept, in accordance with various aspects of the subject technology. Mesh model 24a is an example of a mesh model that is associated with fine cell 18a, while mesh model 24b is an example of a mesh model that is associated with fine cell 18b. because both mesh models 24a and 24b are within the field of view of camera C7, these mesh models are visible in the image obtained by camera C7. Thus, mesh identification module 108 may identify mesh models 24a and 24b as mesh models that are visible in the image obtained by camera C7.

Returning to FIGS. 1 and 2, according to step S214, depthmap module 110 may generate a depthmap for each of the plurality of high-resolution images based on the identified one or more mesh models visible in a corresponding one of the plurality of high-resolution images. In particular, depthmap module 110 may render the identified one or more mesh models (e.g., identified in step S212) into corresponding ones of the plurality of high-resolution images. In a high-resolution image that sees a plurality of mesh models (e.g., mesh models 24a and 24b), the plurality of mesh models visible in that image may be combined. In some aspects, the depth of the closest surface of the plurality of mesh models to a camera may be utilized in generating a depth value, for example, by using a z-buffer method or other depth computation methods.

Figure 11:
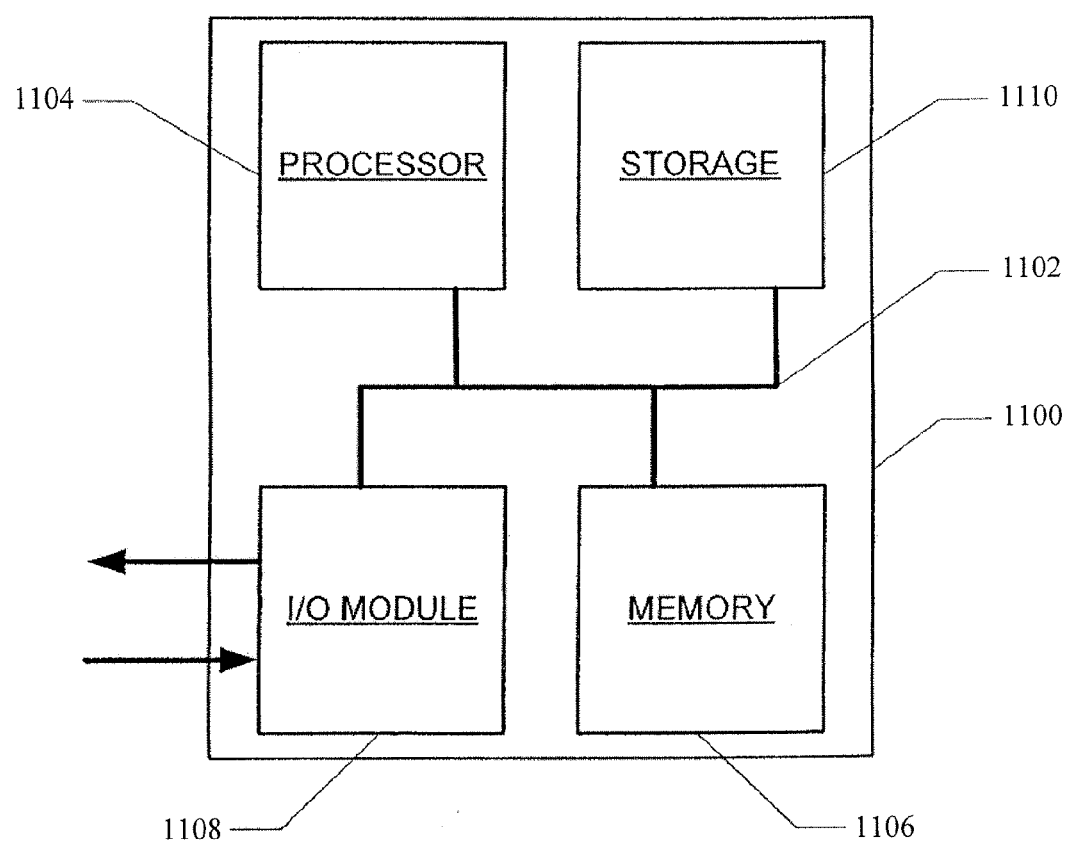
FIG. 11 is a block diagram illustrating components of a controller, in accordance with various aspects of the subject disclosure.

FIG. 11 is a block diagram illustrating components of controller 1100, in accordance with various aspects of the subject disclosure. Controller 1100 comprises processor module 1104, storage module 1110, input/output (I/O) module 1108, memory module 1106, and bus 1102. Bus 1102 may be any suitable communication mechanism for communicating information. Processor module 1104, storage module 1110, I/O module 1108, and memory module 1106 are coupled with bus 1102 for communicating information between any of the modules of controller 1100 and/or information between any module of controller 1100 and a device external to controller 1100. For example, information communicated between any of the modules of controller 1100 may include instructions and/or data. In some aspects, bus 1102 may be a universal serial bus. In some aspects, bus 302 may provide Ethernet connectivity.

In some aspects, processor module 1104 may comprise one or more processors, where each processor may perform different functions or execute different instructions and/or processes. For example, one or more processors may execute instructions for generating a depthmap and one or more processors may execute instructions for input/output functions.

Memory module 1106 may be random access memory ("RAM") or other dynamic storage devices for storing information and instructions to be executed by processor module 1104. Memory module 1106 may also be used for storing temporary variables or other intermediate information during execution of instructions by processor 1104. In some aspects, memory module 1106 may comprise battery-powered static RAM, which stores information without requiring power to maintain the stored information. Storage module 1110 may be a magnetic disk or optical disk and may also store information and instructions. In some aspects, storage module 1110 may comprise hard disk storage or electronic memory storage (e.g., flash memory). In some aspects, memory module 1106 and storage module 1110 are both a machine-readable medium.

Controller 1100 is coupled via I/O module 1108 to a user interface for providing information to and/or receiving information from an operator of system 100. For example, this information may be initialization variables such as the first threshold number, the second threshold number, the third threshold number, and any other suitable variables. The user interface may be a cathode ray tube ("CRT") or LCD monitor for displaying information to an operator. The user interface may also include, for example, a keyboard or a mouse coupled to controller 1100 via I/O module 1108 for communicating information and command selections to processor module 1104.

According to various aspects of the subject disclosure, methods described herein are executed by controller 1100. Specifically, processor module 1104 executes one or more sequences of instructions contained in memory module 1106 and/or storage module 1110. In one example, instructions may be read into memory module 1106 from another machine-readable medium, such as storage module 1110. In another example, instructions may be read directly into memory module 1106 from I/O module 1108, for example from an operator of system 100 via the user interface. Execution of the sequences of instructions contained in memory module 1106 and/or storage module 1110 causes processor module 1104 to perform methods to generate a depthmap for images of one or more structures in an area. For example, a computational algorithm for generating a depthmap for images of one or more structures in an area may be stored in memory module 1106 and/or storage module 1110 as one or more sequences of instructions. Information such as the first threshold number, the second threshold number, the third threshold number, the plurality of images, 3D points, portions of the images, coarse cells, fine cells, sub-regions, mesh models, depthmaps, and other suitable information may be communicated from processor module 1104 to memory module 1106 and/or storage module 1110 via bus 1102 for storage. In some aspects, the information may be communicated from processor module 1104, memory module 1106, and/or storage module 1110 to I/O module 1108 via bus 1102. The information may then be communicated from I/O module 1108 to an operator of system 100 via the user interface.

One or more processors in a multi-processing arrangement may also be employed to execute the sequences of instructions contained in memory module 1106 and/or storage module 1110. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 1104 for execution. Such a medium may take many forms, including, but not limited to, non-volatile media, and volatile media. Non-volatile media include, for example, optical or magnetic disks, such as storage module 1110. Volatile media include dynamic memory, such as memory module 1106. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A computer-implemented method for generating a depthmap for images of structures in a geographic area, the method comprising:
    dividing the geographic area into a plurality of coarse cells, wherein each of the plurality of coarse cells is visible in no more than a first threshold number of a plurality of low-resolution images;
    generating, using multi-view stereo processing, a set of coarse three-dimensional (3D) points of one or more structures in each of the plurality of coarse cells based on the plurality of low-resolution images associated with a corresponding one of the plurality of coarse cells;
    dividing the geographic area into a plurality of fine cells, wherein each of the plurality of fine cells is visible in no more than a second threshold number of a plurality of high-resolution images;
    generating, using multi-view stereo processing, a set of fine 3D points of the one or more structures in each of the plurality of fine cells based on at least a portion of the set of coarse 3D points generated for a corresponding one of the plurality of coarse cells and based on the plurality of high-resolution images associated with a corresponding one of the plurality of fine cells;
    generating a mesh model of the one or more structures in each of the plurality of fine cells based on the set of fine 3D points for a corresponding one of the plurality of fine cells;
    identifying one or more of the mesh models visible in a corresponding one of the plurality of high-resolution images; and
    generating a depthmap for each of the plurality of high-resolution images based on the identified one or more mesh models visible in a corresponding one of the plurality of high-resolution images,
    wherein each of the plurality of low-resolution images comprises metadata that includes a visible surface region estimate of the geographic area, and wherein the visibility of each of the plurality of coarse cells is based on the visible surface region estimates of corresponding ones of the plurality of low-resolution images, and wherein each of the plurality of coarse cells is visible in one of the plurality of low-resolution images if the visible surface region estimate of the one of the plurality of low-resolution images intersects with a corresponding one of the plurality of coarse cells.

2. The method of claim 1, further comprising:
receiving the plurality of high-resolution images; and
generating each of the plurality of low-resolution images based on a corresponding one of the plurality of high-resolution images.

3. The method of claim 2, wherein generating each of the plurality of low-resolution images comprises down sampling each of the plurality of high-resolution images.

4. The method of claim 1, wherein dividing the geographic area into the plurality of fine cells comprises dividing each of the plurality of coarse cells into corresponding ones of the plurality of fine cells.

5. The method of claim 4, wherein the visibility of each of the plurality of fine cells is based on at least a portion of the set of coarse 3D points generated for a corresponding one of the plurality of coarse cells.

6. The method of claim 1, wherein the second threshold number is less than the first threshold number.

7. The method of claim 1, wherein the visible surface region estimate comprises latitude and longitude information of the geographic area.

8. The method of claim 1, wherein dividing the geographic area into a plurality of coarse cells comprises:
identifying one or more portions of the geographic area that are visible in each of the plurality of low-resolution images; and
merging the one or more portions of the geographic area to generate the plurality of coarse cells such that each of the plurality of coarse cells is visible in no more than the first threshold number of the plurality of low-resolution images.

9. The method of claim 1, wherein each of the plurality of fine cells is visible in one of the plurality of high-resolution images if $Y/X \geq K$, where X is the number of coarse 3D points that are inside a corresponding one of the plurality of fine cells, Y is the number of coarse 3D points that are inside the corresponding one of the plurality of fine cells and project inside the one of the plurality of high-resolution images, and K is a visibility factor.

10. The method of claim 9, wherein K is between 0.4 and 0.6.

11. The method of claim 1, wherein the multi-view stereo processing is patch based.

12. The method of claim 1, wherein each coarse 3D point and fine 3D point comprises a surface portion and a pointer normal to the surface portion.

13. The method of claim 1, wherein generating the mesh model comprises converting, using a Poisson surface reconstruction operation, the set of fine 3D points for each of the plurality of fine cells into corresponding one or more of the mesh models.

14. The method of claim 1, further comprising trimming the mesh model to eliminate one or more disparities from the one or more structures in a corresponding one of the plurality of fine cells.

15. The method of claim 1, wherein generating the depthmap comprises rendering the identified one or more mesh models into corresponding ones of the plurality of high-resolution images.

16. A system for generating a depthmap for images of structures in a geographic area, the system comprising:
a cluster module configured to divide the geographic area into a plurality of coarse cells and a plurality of fine cells, wherein each of the plurality of coarse cells is visible in no more than a first threshold number of a plurality of low-resolution images, wherein each of the plurality of fine cells is visible in no more than a second threshold number of a plurality of high-resolution images;
a three-dimensional (3D) point module configured to generate, using multi-view stereo processing, a set of coarse three-dimensional (3D) points of one or more structures in each of the plurality of coarse cells based on the plurality of low-resolution images associated with a corresponding one of the plurality of coarse cells, wherein the 3D point module is further configured to generate, using multi-view stereo processing, a set of fine 3D points of the one or more structures in each of the plurality of fine cells based on at least a portion of the set of coarse 3D points generated for a corresponding one of the plurality of coarse cells and based on the plurality of high-resolution images associated with a corresponding one of the plurality of fine cells;
a mesh generation module configured to generate a mesh model of the one or more structures in each of the plurality of fine cells based on the set of fine 3D points for a corresponding one of the plurality of fine cells;
a mesh identification module configured to identify one or more of the mesh models visible in a corresponding one of the plurality of high-resolution images; and
a depthmap module configured to generate a depthmap for each of the plurality of high-resolution images based on the identified one or more mesh models visible in a corresponding one of the plurality of high-resolution images,
wherein the mesh generation module is configured to divide each of the plurality of fine cells into a plurality of sub-regions, and wherein each of the plurality of sub-regions is associated with no more than a third threshold number of fine 3D points from the set of fine 3D points associated with a corresponding one of the plurality of fine cells.

17. The system of claim 16, wherein the cluster module is configured to receive the plurality of high-resolution images and to generate each of the plurality of low-resolution images based on a corresponding one of the plurality of high-resolution images.

18. The system of claim 16, wherein the cluster module is configured to divide each of the plurality of coarse cells into corresponding ones of the plurality of fine cells.

19. The system of claim 16, wherein the cluster module is configured to identify one or more portions of the geographic area that are visible in each of the plurality of low-resolution images and to merge the one or more portions of the geographic area to generate the plurality of coarse cells such that each of the plurality of coarse cells is visible in no more than the first threshold number of the plurality of low-resolution images.

20. The system of claim 16, wherein the mesh generation module is configured to convert, using a Poisson surface reconstruction operation, the set of fine 3D points for each of the plurality of fine cells into corresponding one or more of the mesh models.

21. The system of claim 16, wherein the mesh generation module is configured to trim the mesh model to eliminate one or more disparities from the one or more structures in a corresponding one of the plurality of fine cells.

22. The system of claim 16, wherein the depthmap module is configured to render the identified one or more mesh models into corresponding ones of the plurality of high-resolution images.

23. A computer-implemented method for generating a depthmap for images of structures in a geographic area, the method comprising:

dividing the geographic area into a plurality of coarse cells, wherein each of the plurality of coarse cells is visible in no more than a first threshold number of a plurality of low-resolution images;

generating, using multi-view stereo processing, a set of coarse three-dimensional (3D) points of one or more structures in each of the plurality of coarse cells based on the plurality of low-resolution images associated with a corresponding one of the plurality of coarse cells;

dividing the geographic area into a plurality of fine cells, wherein each of the plurality of fine cells is visible in no more than a second threshold number of a plurality of high-resolution images;

generating, using multi-view stereo processing, a set of fine 3D points of the one or more structures in each of the plurality of fine cells based on at least a portion of the set of coarse 3D points generated for a corresponding one of the plurality of coarse cells and based on the plurality of high-resolution images associated with a corresponding one of the plurality of fine cells;

generating a mesh model of the one or more structures in each of the plurality of fine cells based on the set of fine 3D points for a corresponding one of the plurality of fine cells;

identifying one or more of the mesh models visible in a corresponding one of the plurality of high-resolution images; and generating a depthmap for each of the plurality of high-resolution images based on the identified one or more mesh models visible in a corresponding one of the plurality of high-resolution images, wherein generating the mesh model comprises dividing each of the plurality of fine cells into a plurality of sub-regions, and wherein each of the plurality of sub-regions is associated with no more than a third threshold number of fine 3D points from the set of fine 3D points associated with a corresponding one of the plurality of fine cells.

* * * * *